United States Patent
Lysen et al.

(10) Patent No.: US 6,457,373 B1
(45) Date of Patent: Oct. 1, 2002

(54) SHOCK PROTECTION DEVICE FOR POSITION-MEASURING PROBES

(75) Inventors: Heinrich Lysen, Garching; Michael Hermann, Villingen, both of (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/463,986

(22) PCT Filed: Jun. 17, 1999

(86) PCT No.: PCT/DE99/01786

§ 371 (c)(1),
(2), (4) Date: Feb. 16, 2000

§ 102(e) Date: Feb. 16, 2000

(87) PCT Pub. No.: WO99/66287

PCT Pub. Date: Dec. 23, 1999

(30) Foreign Application Priority Data

Jun. 17, 1998 (DE) .......................... 198 26 615

(51) Int. Cl.[7] .................. G01D 11/30; G01D 11/24; G01B 21/26; G01C 19/00
(52) U.S. Cl. ............... 73/866.5; 33/561; 73/431
(58) Field of Search .................. 73/866.5, 865.9, 73/431; 33/556, 558, 559, 561, 503

(56) References Cited

U.S. PATENT DOCUMENTS

| | | | | |
|---|---|---|---|---|
| 3,841,462 A | * | 10/1974 | Schmidt | 198/345.1 |
| 4,158,918 A | * | 6/1979 | Voinescu | 33/792 |
| 5,079,960 A | * | 1/1992 | Kauer et al. | 73/865.9 |
| 5,810,080 A | * | 9/1998 | Meynier | 166/66 |

FOREIGN PATENT DOCUMENTS

| | | | | |
|---|---|---|---|---|
| DE | 3121363 A1 | * | 12/1982 | ........... G01B/21/04 |
| DE | 195 46 405 | | 6/1997 | |
| DE | 198 00 534 | | 1/1998 | |
| DE | 198 00 901 | | 7/1999 | |
| GB | 2 271 422 | | 4/1994 | |
| JP | 4-269154 | * | 9/1992 | ............ G01B/5/00 |

OTHER PUBLICATIONS

Patent Abstracts of Japan, vol. 017, No. 059 (M–1363), Feb. 5, 1993, & JP 04 269154 A (Okuma Mach Works Ltd.), Sep. 25, 1992, English Abstract.

* cited by examiner

*Primary Examiner*—Thomas P. Noland
(74) *Attorney, Agent, or Firm*—Nixon Peabody LLP; David S. Safran

(57) ABSTRACT

The shock protection device prevents damage to optically and micromechanically acting gyroscopes. The gyroscope or precision instrument to be protected can be located in an inner housing shell which is spaced apart from an outer housing shell by elastic elements, and is thereby protected against shock. The inner housing shell can be brought temporarily into accurate mechanical contact with the outer housing shell by an electromechanical device. The spatial orientations of the inner and outer housing shells then correspond with high precision. In a further embodiment of the invention, the electromechanical device can be used precisely conversely to deactivate an existing shock protection and temporarily to bring about direct contact between a sensing element and an object to be checked on the occasion of a measuring operation.

18 Claims, 2 Drawing Sheets

US 6,457,373 B1

SHOCK PROTECTION DEVICE FOR POSITION-MEASURING PROBES

BACKGROUND OF THE INVENTION

1. Field of the Invention

The present invention relates to a shock protection device for position measuring, probes or gyroscopes, in particular those which are equipped with an optical gyroscopic system or with a mechanical oscillator.

2. Description of the Related Art

A shock protection system for position measuring probes of the type, as described in the German patent references DE 19800534.2 or DE 19546405.2, is not known. The devices used by the person skilled in the art in order to protect chronometers or electric precision instruments such as, for example, galvanometers against shock cannot be used in this regard to provide shock protection for position measuring probes or gyroscopes.

The problem on which the invention is based consists in the following: when use is made of position measuring probes, they have to be protected against excessive shocks or accelerations. This is based, in particular, on the sensitivity of the components to such shocks. Substantial repair costs can therefore arise through inadvertently dropping such instruments. On the other hand, the position measuring probes must be applied to a surface to be measured in a defined fashion, that is to say with mechanical precision without backlash or damaging flexibility. These aspects oppose one another to a certain extent, since it is not possible to fit conventional cushioning to the probes discussed here without adversely affecting their measuring accuracy.

SUMMARY OF THE INVENTION

In accordance with the invention, the present problem is solved by providing the position measuring probes a shock protection which is temporarily deactivated on the occasion of a measuring operation to be carried out, or is made available only proportionally. For this purpose, in a first basic embodiment, the shock protection has the following features:

an outer housing shell is present which can be applied to a surface to be measured in a defined fashion,
  at least one inner housing shell is present which encloses one or more sensors or instruments, in particular angular position sensors,
  the inner housing shell is spaced apart by one or more cushioning or shock-absorbing elements with reference to an outer enclosing housing shell or a bearing surface during a time phase in which anti-shock functions are prioritized,
  the inner housing shell is brought into self-closed mechanical contact with, reference to an enclosing outer housing shell or a bearing surface during a phase for detecting measured values, and
  the inner housing shell can be brought into self-closed mechanical contact with the outer shell or a bearing surface by means of an electromechanical device or manually.

In a second basic embodiment, the shock protection according to the invention for a position measuring probe has the following features:

the position measuring probe can be brought into a first operating state by means of a device which can be actuated manually or by motor, in which it is protected completely against shocks acting from outside, but in which it cannot be used for the purposes of position measurement, and
  the position measuring probe can be brought into a second operating state by: means of the device which can be actuated manually or by motor, in which it can carry out position measurements, but during the period of which it is not completely protected against shocks acting from outside.

It is now possible in accordance with the invention to protect position measuring probes and gyroscopes based on optical gyroscopes, specifically fiber-optic gyroscopes, and those having one or more mechanical vibrators (oscillators), against shocks during transportation, during operation and also when being applied to a surface to be measured. Such surfaces can specifically be the cylindrical surfaces of rollers such those used to produce films, foils, sheets and paper materials, and which must have a highly accurate parallelism. The invention is therefore, particularly suitable for carrying out a very accurate measurement of the parallelism of such rollers without there being a large risk of inadvertently damaging the relatively costly measuring apparatus used by incorrect deposition, mounting or by dropping.

In accordance with the first basic embodiment, the invention is based on the fact that instead of a single housing for appropriate devices, provision is now made of a housing which has an inner and an outer shell. The two shells are spaced apart from one another in the inactive state of the probe by a special cushion. A measuring system located inside the inner housing shell is thereby protected elastically against shocks. Not until shortly before the determination of a measured value and after the measuring probe has been brought into a measuring position of interest is an electrically operated device used to ensure that the inner and outer shells are brought into mechanical contact with one another which is defined with high accuracy. Immediately after the measured value is taken, it is ensured that the mechanical contact between the two shells is released again. Instead of the electrically operated device which makes the mechanical contact, it is also possible to provide a device which operates similarly and is to be actuated manually and which can be configured more simply in structural terms. A device operated by compressed air can also be provided for comparable problems requiring a relatively large housing. A typical cycle of a measuring operation thus consists in that the measuring probe is applied to a surface to be measured, a trip element or switch is then actuated by means of the electrically operated device to produce precise mechanical contact between the two shells, and an electronic system (preferably located in the interior of the two shells) then senses and electronically evaluates the positional and/or angular values of interest, and thereafter the mechanical contact between the two shells is released again by the electrically operated device. The measured values obtained are further used and evaluated after these steps.

In accordance with the invention, mechanical contact is made between the inner and outer shells preferably by means of a contact-making movement in the direction of one of the spaced diagonals of these shells, with the result that the periphery of the inner shell can make contact with at least three bearing points on the inside of the outer shell. The outer shell acts in this way to a certain extent, as a mechanical guide prism for the inner shell. It is possible in accordance with the invention to provide any desired elastic materials as cushioning for the purpose of absorbing shocks on the said inner shell with respect to the outer shell. However, it is advantageous to provide expanded silicone materials as cushioning, since not only can these be used over a large temperature range and are virtually nonflammable, but their elastic properties also show no particularly pronounced temperature response.

DETAILED DESCRIPTION OF THE INVENTION

Figure 1:
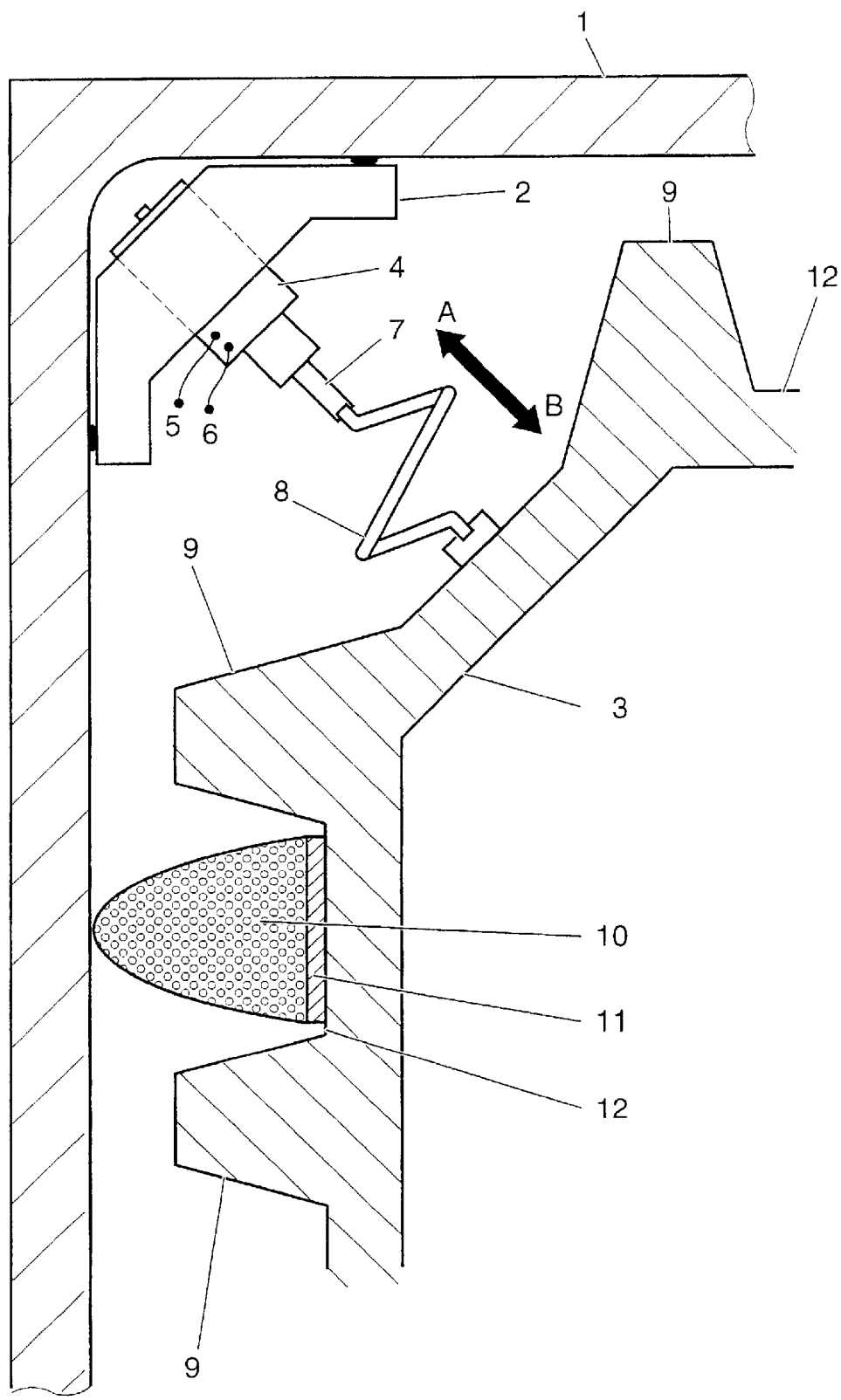
FIG. 1 shows the fundamental principle of a first basic embodiment for a device acting in two dimensions.

Although the arrangement shown in FIG. 1 displays shock protection in two directions, it can be used directly to produce a device working correspondingly in three dimensions. FIG. 1 shows, as a representation of a section, the interspace between the shells which is fitted with an electromechanical device. A representation of those corners or edges of the position measuring probe which are not used to make mechanical contact between the shells is dispensed with. In detail, reference numeral 1 denotes an outer shell of the housing according to the invention for a position measuring probe or for a precision instrument, while an associated inner shell is identified by reference numeral 3. If they are not in direct mechanical contact with one another, the two shells 1 and 3 are spaced apart mutually from one another by one, preferably a plurality of elastic cushioning elements 10, and with a prescribed elasticity. They thereby protect an arrangement situated in the inner shell 3, specifically a gyroscope, against mechanical shock. A cushioning element 10 preferably comprises of an expanded elastic material or an elastomeric material. It preferably has an approximately semicircular cross section and is fixed on the inner shell 3 by means of a heat-resistant adhesive layer 11. In order to achieve a sufficient spring excursion for the cushioning element 10, the latter is preferably inserted into depressions 12 which are recessed into the inner shell 3 and thereby define local projections 9 which serve as bearing surfaces for making mechanical contact. A relative movement of the inner shell 3 in the direction of the outer shell 1 can thus take place only against a spring force. The damping properties of the cushioning element 10 can be varied depending on whether the elastic material which is used in the element is specified rather as being open-cell or as being solid.

The elastic connection between the inner shell 3 and outer shell 1 can be undone temporarily by activating the electromechanical device 4 (with terminal contacts 5 and 6) located in a corner of the outer housing 1. The electromechanical device 4 is fixed on the outer shell, for example, by means of a fixing bracket 2, and is preferably constructed as a low-volume DC linear motor. The push rod 7 thereof can either draw or push the inner housing 3 in the direction of the arrowheads A or B by means of a spring element 8, depending on the type of power supplied. Thus, if the inner housing 3 is drawn in the direction of the arrowhead A, the result of this is that the projections 9 are applied sequentially (possibly simultaneously) to the inner surfaces of the outer shell 1. As a result, the shells 1 and 3 are in an exactly defined position relative to one another, and the spatial position and orientation of the outer shell 1 is transmitted to those of the inner shell 3. In this phase, which usually corresponds to a measuring phase, the shock-reducing effect of the cushioning elements 10 is eliminated, as is that of the elastic element 8. After termination of a measuring operation, the inner shell 3 is pushed back again by the electromechanical device 4. The cushioning elements 10 thereby once again take over the function of providing spacing and reducing shocks between the outer and inner shells.

If it is to be possible to bring the outer and inner shells into contact with one another in all three coordinates of space, it is advantageous to provide the drawing/pushing direction of the electromechanical device 4 approximately in the direction of the., corresponding space diagonals of a shell. Success is achieved in this way in creating an exactly defined relative position between the inner shell 3 and outer shell 9.

Figure 2:
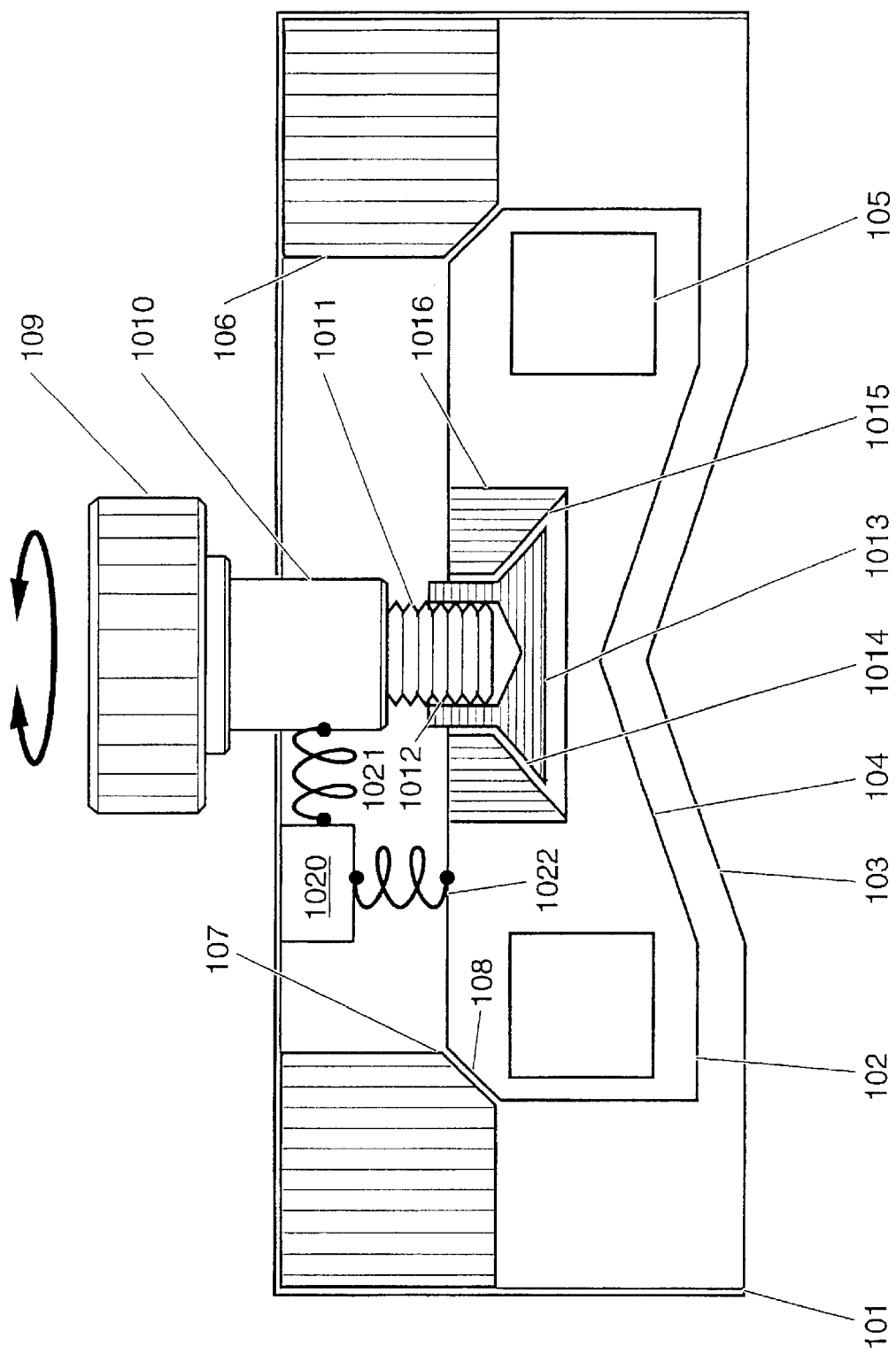
FIG. 2 shows the fundamental principle of a second basic embodiment.

A second solution of the above-named problem is provided in accordance with FIG. 2, which shows another device according to the invention in a cross-sectional view: Located inside an outer shell 101 serving as protection against mechanical effects, is an instrument panel 102 which holds or supports a measuring instrument susceptible to shock, for example a gyroscopic system 105 (drawn schematically). The gyroscopic system can also comprise a plurality of gyroscopes not shown aligned orthogonally relative to one another. The outer shell 101 is closed almost on all sides, but has an opening in the form of a cutout 103 on the bottom surface and the lateral surfaces (opening in the bottom surface not identified in more detail). Owing to the cutout 103, the instrument panel provided with a prismatic bearing surface 104 can, if required, be brought into direct and highly accurate mechanical contact with a cylindrical roller not shown situated below the cutout 103, or with another object to be measured. However, the position of the instrument panel 102 shown in the figure represents a first operating state of the device according to the invention, in which protection is provided against shocks acting from outside by shock-absorbing elements such as, for example, an expanded plastic cushion 106. In order to be brought from this position into mechanical contact with a cylindrical roller located therebelow, it is necessary for the instrument panel 102 to be lowered. Provided for this purpose is a device which is operated manually or by motor and comprises, as shown, for example a screw 101 and a coupling plate 1013 provided with a threaded bore 1012. Screw 1011 can be turned in a right-handed or left-handed fashion by the rotary button 109 and/or an electric motor drive (by motor 1010), with the result that it is possible to effect a variable spacing of the coupling plate 1013 relative to the underside and topside of the outer shell 101. Coupling plate 1013 preferably has a conical surface 1014, so that the instrument panel 102 can be raised or lowered by means of a shock-absorbing element, essentially permanently connected to the latter, in the form of an expanded plastic cushion 1016 and the conical surface 1015 thereof. With the screw 1011 tightened, the instrument panel 102 is therefore brought into a cushioned rest position in which it is sufficiently protected against damaging accelerations by means of the combined anti-shock action of the expanded plastic cushions 106 and 1016. As shown, in this position, a beveled bearing surface 108 of the instrument panel is situated directly on a beveled edge 107 of the expanded plastic cushion 106, with the result that an anti-shock action is effected in at least two directions in space.

By means of a connecting line 1021, the motor 1010 can be actuated by a schematically represented combination 1020 comprising an energy supply and a measuring and control computer. This combination 1020 is connected without wires or, equally, by means of a connecting cable 1022 to the instruments, in order to provide power and/or transmission of measured or controlled variables.

Although not shown in the drawing, it may be seen that upon contact being made with an object (not shown) to be measured the complete protection of instruments such as, for example, a gyroscopic system 105, in particular a laser gyroscopic system, against shocks acting from outside is undone after lowering the instrument panel 101, in an essentially linear way, by means of the screw 1011, threaded bore 1012 and coupling plate 1013. In accordance with the invention, it is possible to provide a spring excursion of 5 to 25 mm for the relative movement between the gyroscope housing and protective housing by means of the anti-shock device or buffer. The protective housing can additionally be equipped with an electronic interface system, a keyboard or an indicating device/display. In addition to or instead of a gyroscopic system 105, it is possible to provide on the instrument panel 102 an inclinometer which can be read off usually or electronically.

Moreover, the shock of the contact between the instrument panel and an object to be measured can be reduced by providing in the instrument panel additional spring elements which, however, are pressed back in the case of complete contact into bores or cutouts provided, and then no longer influence the actual measuring operation.

The shock protection described above is preferably used in the industrial application of laser gyroscopes in connection with the checking of the parallelism of roller arrangements which are used in producing films, foils, sheets or paper material.

What is claimed is:

1. A shock protection device for protecting a position measuring probe comprising:

an outer shell;

an inner shell for supporting said position measuring probe, said inner shell being movably disposed within said outer shell to allow relative displacement of said inner shell relative to said outer shell when said shock protection device is in an operating state;

at least one shock-absorbing means disposed between said outer shell and said inner shell for absorbing shock exerted on said outer shell thereby protecting said position measuring probe supported on said inner shell against shock exerted on said outer shell when said shock protection device is in an operative state; and at least one engagement means for engaging said inner shell to said outer shell to thereby establish precise positioning of said inner shell relative to said outer shell when said shock protection device is in an inoperative state, wherein said position measuring probe measures at least one of an absolute position and a relative position of an object with respect to a fixed coordinate system.

2. The shock protection device of claim 1, wherein said position measuring probe is adapted to measure alignment of cylindrical objects.

3. The shock protection device of claim 2, wherein said cylindrical objects are rollers.

4. The shock protection device of claim 1, wherein said position measuring probe includes at least one gyroscopic system.

5. The shock protection device of claim 1, wherein said inner shell is a housing for said position measuring probe.

6. The shock protection device of claim 1, wherein at least one of said outer shell and said inner shell includes bearing surfaces that contact a surface of the other to establish precise positioning of said inner shell relative to said outer shell when said shock protection device is in an inoperative state.

7. The shock protection device of claim 1, wherein said at least one shock-absorbing means is an elastic cushioning element.

8. The shock protection device of claim 1, wherein said inner shell includes depressions and said at least one shock-absorbing means is disposed in said depressions.

9. The shock protection device of claim 8, wherein said inner shell includes local projections which provide bearing surfaces that contact said outer shell when said shock protection device is in an inoperative state.

10. The shock protection device of claim 1, wherein said engagement means includes an electromechanical device.

11. The shock protection device of claim 10, wherein said electromechanical device is a DC linear motor.

12. The shock protection device of claim 10, wherein said engagement means includes a push rod for mechanically displaceably connecting one of said inner shell and said outer shell to said electromechanical device.

13. The shock protection device of claim 1, wherein said engagement means is manually operable.

14. The shock protection device of claim 13, wherein said engagement means includes a manually operable threaded screw and a threaded bore.

15. The shock protection device of claim 14, wherein said engagement means includes a rotary motor for electrically rotating said manually operable threaded screw.

16. The shock protection device of claim 1, wherein said inner shell is movably disposed within said outer shell to allow at least two degrees of movement when said shock protection device is in an operating state.

17. The shock protection device of claim 16, wherein said inner shell is movably disposed within said outer shell to allow three degrees of movement when said shock protection device is in an operating state.

18. A shock protection device for protecting a gyroscope of a position measuring probe adapted to measure at least one of an absolute position and a relative position of a cylindrical object with respect to a fixed coordinate system comprising:

an outer shell adapted to engage said cylindrical object;

an inner shell adapted to support said gyroscope, said inner shell being movably disposed within said outer shell to allow relative displacement of said inner shell relative to said outer shell in at least two degrees of movement when said shock protection device is in an operating state;

at least one elastic cushioning element disposed between said outer shell and said inner shell for absorbing shock exerted on said outer shell thereby protecting said gyroscope against shock exerted on said outer shell when said shock protection device is in an operative state; and at least one engagement device adapted to engage said inner shell to said outer shell along a bearing surface provided on at least one of said outer shell and said inner shell to thereby establish precise positioning of said inner shell relative to said outer shell when said shock protection device is in an inoperative state.

\* \* \* \* \*